United States Patent [19]

Asahi

[11] Patent Number: 4,835,706
[45] Date of Patent: May 30, 1989

[54] CENTRALIZED CONTROL SYSTEM FOR CONTROLLING LOADS SUCH AS AN ELECTRIC MOTOR

[75] Inventor: Shigeo Asahi, Mie, Japan

[73] Assignee: Kabushiki Kaisha Toshiba, Kawasaki, Japan

[21] Appl. No.: 71,736

[22] Filed: Jul. 9, 1987

[30] Foreign Application Priority Data

Jul. 16, 1986 [JP] Japan .............................. 61-167377

[51] Int. Cl.⁴ ............................................ G06F 15/56
[52] U.S. Cl. .................................... 364/492; 364/200; 364/132; 340/825.05; 340/825.06
[58] Field of Search .............. 364/492, 132, 200, 900; 340/825.05, 825.06

[56] References Cited

U.S. PATENT DOCUMENTS

| | | | |
|---|---|---|---|
| 3,585,595 | 6/1971 | Slavin et al. | 340/825.05 |
| 4,103,288 | 7/1978 | Westman | 340/825.05 |
| 4,195,351 | 3/1980 | Barner et al. | 364/900 |
| 4,204,249 | 5/1980 | Dye et al. | 364/200 |
| 4,326,250 | 4/1982 | McCullough | 364/200 |
| 4,562,550 | 12/1985 | Beatty et al. | 364/492 |
| 4,615,029 | 9/1986 | Hu et al. | 340/825.05 |
| 4,627,070 | 12/1986 | Champlin et al. | 340/825.05 |
| 4,736,465 | 4/1988 | Bobey et al. | 340/825.05 |
| 4,747,041 | 5/1988 | Engle et al. | 364/200 |

Primary Examiner—Parshotam S. Lall
Assistant Examiner—V. N. Trans
Attorney, Agent, or Firm—Foley & Lardner, Schwartz, Jeffery, Schwaab, Mack, Blumenthal & Evans

[57] ABSTRACT

A centralized control system for controlling loads includes local or slave control stations, the number of which corresponds with the number of electric motors as loads, the local control stations each executing control of the making and breaking of each motor main circuit, a start compensating operation, and overload and phase-loss protection operations; a key or master control station for transmitting signals for making and breaking each motor main circuit, data signals associated with a soft starting period, and tripping conditions to each local control station, to thereby control the local control stations in a centralized manner; and optical fiber cables connecting between the key control station and the local control stations for data transmission so that a line of loop signal transmission path is formed. When optical signals are supplied to each local control station from the key control station, the optical signals are converted to electrical signals at each local control station. The local control stations fetch the electrical signals directed to the individual local control stations. The electrical signals directed to the other local control stations are converted to optical signals again and are transferred to the next local control station through the optical fiber cable.

2 Claims, 5 Drawing Sheets

# CENTRALIZED CONTROL SYSTEM FOR CONTROLLING LOADS SUCH AS AN ELECTRIC MOTOR

BACKGROUND OF THE INVENTION

1. Field of the Invention

This invention relates generally to centralized control systems for controlling a number of loads such as an electric motor, and more particularly to a centralized control system wherein optical fiber cables are employed for transmitting data signals between a key or master control station and a number of local or slave control stations provided at the respective loads.

2. Description of the Prior Art

Conventional systems of the type described above include an apparatus generally called a "control center." The control center comprises a plurality of units each including main circuit equipment such as a magnetic contactor, a monitor, a controller and the like. The units are provided at the respective loads and control the loads such as an electric motor.

In the above-described control center, since a large number of power cables radially extending from the control center are connected to respective loads, the wiring work becomes complicated. In view of this disadvantage, the prior art has provided an improvement wherein the magnetic contactors are disposed in the vicinity of the respective loads so that control of the opening and closing of the respective magnetic contactors is centralized to one control unit. However, a large number of wires for connecting the control unit to the respective loads and magnetic contactors are radially extended from the control unit and the wiring work still becomes complicated.

In both of the above-described control systems, a main circuit is opened and closed by the magnetic contactor which includes mechanical contacts, these contacts are a maintenance headache. Further, it is difficult to couple electronic appliance equipment such as a programmable controller to the main circuit so that precise control over the loads is provided.

Thus, the conventional centralized control systems for controlling a number of loads such as a motor, a heater and an electromagnetic valve presents several disadvantage. Since a large number of the power cables extend from the control center, the wiring work becomes complicated and since the magnetic contactors, each having two contacts, are employed, troublesome maintenance work is required on the contacts. Another disadvantage is that the loads cannot be controlled precisely.

SUMMARY OF THE INVENTION

Therefore, a first object of this invention is to provide an improved centralized system for controlling a number of loads such as an electric motor wherein the wiring work is simplified by employing a loop of signal transmission paths for delivering and receiving data signals between a key control station and each of a plurality of local control stations.

A second object of this invention is to provide an improved centralized system for controlling a number of loads such as an electric motor wherein troublesome maintenance associated with making and breaking a main circuit is eliminated.

A third object of this invention is to provide an improved centralized system for controlling a number of loads such as an electric motor wherein the loads are precisely controlled by employing programmable controllers.

A fourth object of this invention is to provide an improved centralized system for controlling a number of loads such as an electric motor wherein start compensation can be attained for the motor by way of a simplified arrangement.

The centralized control system in accordance with this invention comprises a key or master control station for controlling a number of loads such as a motor and a number of local or slave control stations provided at the respective loads, each having a semi-conductive switching element incorporated in a main circuit for each load. Optical fiber cables are provided for connecting the key control station in series with the local control stations to thereby form a loop line of signal transmission paths.

According to the above-described centralized control system, command signals delivered from the key control station are transmitted to each one of the local control stations through the optical fiber cables. When supplied with the command signals, each local control station fetches the command signals directed thereto and delivers other command signals directed to the other local control stations to the next local control station. When the command signals are inputted, each local control station controls the load by opening and closing the semiconductive switching element in accordance with the contents of the command signals.

Since the key control station is connected in series with the local control stations, each local control station serves as a signal relay for relaying the command signals and wiring of the optical fiber cables is simplified as compared with those in the conventional systems wherein a large number of power cables or control signal cables extend radially from the control unit. Furthermore, since the semi-conductive switching element makes and breaks the motor main circuit, maintenance work can be simplified as compared with that in the conventional control systems wherein the magnetic contactors are employed for making and breaking the motor main circuit. Additionally, precise control of the loads can be attained by employing a programmable controller, a microcomputer or the like.

Other and further objects of this invention will become obvious upon an understanding of the illustrative embodiment about to be described and various advantages not referred to herein will occur to one skilled in the art upon employment of the invention in practice.

DESCRIPTION OF THE PREFERRED EMBODIMENT

Figure 1:
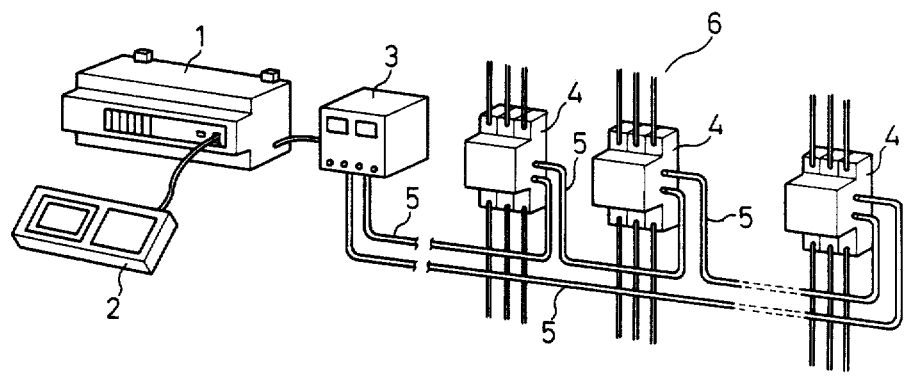
FIG. 1 is a perspective view of the key control station and the local control stations connected with the optical fiber cables in accordance with the centralized control system of an embodiment of this invention.

One embodiment will now be described with reference to the drawings. Referring first to FIG. 1, a programmable controller 1 of the general purpose type is provided for supplying a key or master control station 3 with load controlling on-off signals in accordance with a sequence preprogrammed by a program loader 2. A plurality of local or slave control stations 4 are provided in the vicinity of a plurality of loads such as an electric motor, an electric heater and an electromagnetic valve, respectively. Three of such local control stations 4 are shown in FIG. 1. The key control station 3 is connected in series with the local control stations 4 with optical fiber cables 5 so that each local control station 4 serves as a signal relay for the next local control station. More particularly, an optical fiber cable 5 is connected to a signal delivering end of the key control station 3 at one end and to a signal receiving end of one of the local control stations 4 at the other end. Another optical fiber cable 5 is connected to the signal delivering end of the local control station 4 at one end and to the signal receiving end of the next local control station 4 at the other end. A plurality of local control stations 4 are thus connected in series by the optical fiber cables 5. The signal delivering end of the last local control station 4 is connected to one end of an optical fiber cable 5 and the other end of the optical fiber cable 5 is connected to the signal receiving end of the key control station 3, thereby forming a line of loop signal transmission path. Each local control station 4 is provided with a microcomputer and controls each corresponding load such as a motor so that each load performs such operations as follows: The making and breaking of a main circuit of the motor, a start compensating operation in which an amount of starting current flowing into the motor is restricted to thereby allow the motor to start softly, an overload protection operation in which the motor main circuit is interrupted when an overcurrent flows into the motor, and a phase-loss protection operation.

The key control station 3 delivers optical signals to the local control stations 4 through the optical fiber cables 5, based on a signal supplied from the programmmble controller 1, thereby controlling the operation of making and breaking of the motor main circuit, executed by the local control station 4, in accordance with the program. The key control station 3 also has functions as follows: The setting of a soft starting period (a period of compensating the start of the motor) as an operative condition for the start compensating operation executed by each local control station 4, the setting of a tripping condition as an operative condition for the overload protection operation executed by each local control station 4, the displaying of data of the foregoing operative conditions, progress of the foregoing operations executed by each local control station 4, the value of the overload current at each local control station 4, and data associated with the soft starting period and tripping conditions both set for each local control station 4 by the key control station 3.

Figure 2:
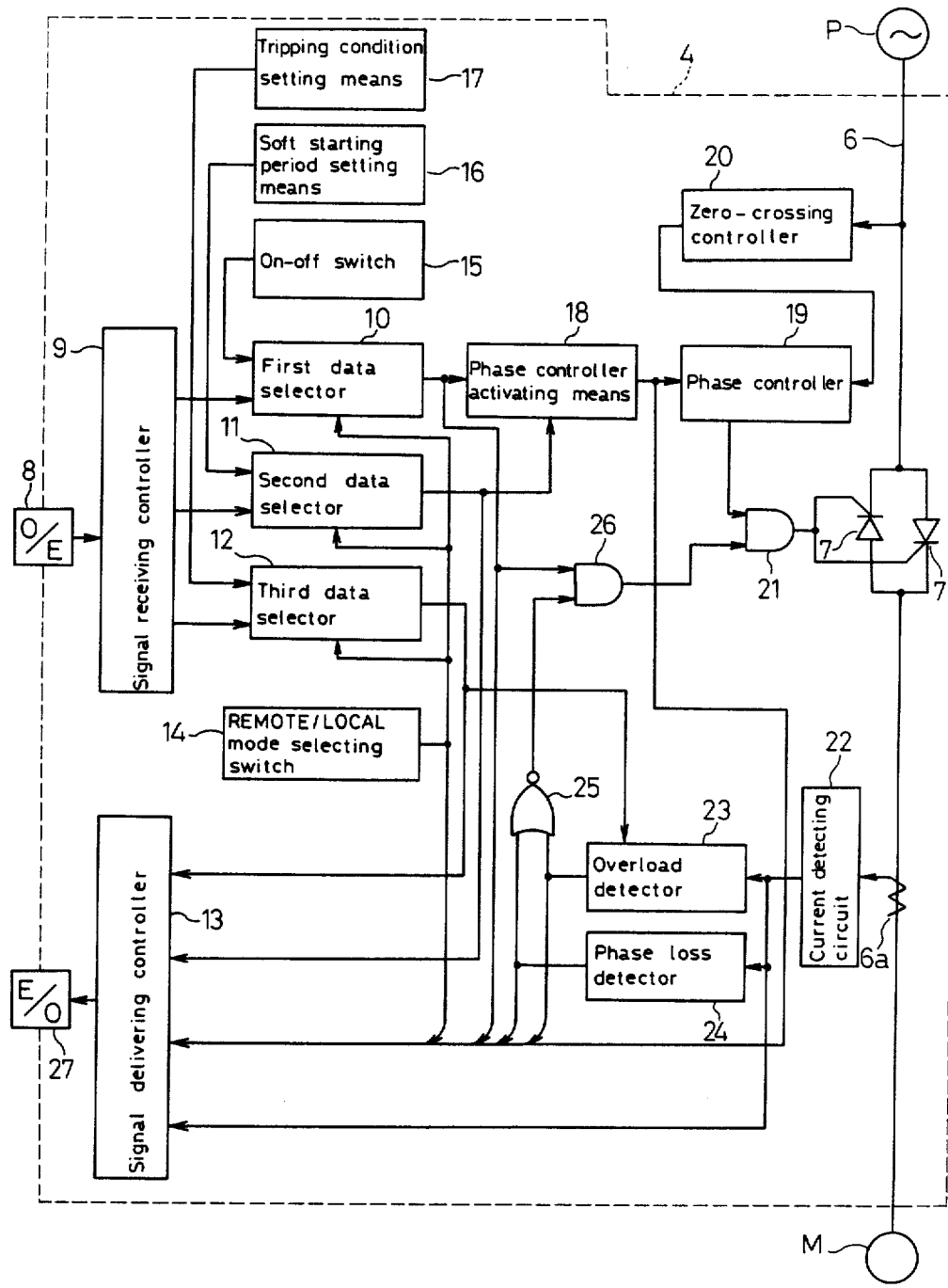
FIG. 2 is a block diagram illustrating the arrangement of one of the local control stations.

The local control stations 4 will now be described in detail. Each local control station 4 is designed so that the above-described operations thereof are performed mainly by the microcomputer. FIG. 2 illustrates functions of each local control station 4. As shown in FIG. 2, a current transformer 6a is provided in a main circuit 6 which supplies electrical power from a power-supply source P to an electric motor M as one of the loads. Two thyristors 7 each serving as a semi-conductive switching element are provided between the power-supply source P and the current transformer 6a in the motor main circuit 6. The thyristors 7 are connected in parallel with each other in the opposite directions. An optical connector 8 is provided for converting optical signals, supplied from the key control station 3 through the optical fiber cables 5 as serial signals, to electrical signals. The electrical signals are supplied from the optical connector 8 to a signal receiving controller 9 as a signal receiving end. Among the signals, those directed to the individual local control stations 4 are brought into the signal receiving controller 9 to be thereby transferred to each of first to third data selectors 10–12. The signals directed to the other local control stations 4 are transferred to a signal delivering controller 13 as a signal delivering end. Accordingly, the signal receiving and delivering controllers 9 and 13 of each local control station 4 serve as a signal relay for the other local control stations 4. Each of the data selectors 10–12 operates based on signals supplied from a REMOTE/LOCAL mode selecting switch 14. The command signals supplied to the signal receiving controller 9 from the key control station 4 is effectuated when the REMOTE/LOCAL mode selecting switch 14 is maintained at a REMOTE position. When the REMOTE/LOCAL mode selecting switch 14 is maintained at a LOCAL position, the data selectors 10–12 operate as follows: The first data selector 10 effectuates data supplied from an on-off switch 15 provided at each local control station 4, the second data selector 11 effectuates data supplied from a soft starting period setting means 16 provided at each local control station 4, and the third data selector 12 effectuates data supplied from a tripping condition setting means 17 provided at each local control station 4 for load protection. When an "on" signal is supplied to a phase controller activating means 18 from the on-off switch 15 or when the "on" signal is supplied to the phase controller activating means 18 from the key control station 3 through the first data selector 10, a phase controller 19 is activated to thereby turn the thyristors 7 on and off. Thus, the phase is controlled by gradually increasing a phase-control angle for the smooth start period, thereby gradually increasing a voltage applied to the motor M to control a starting current applied thereto. In this case, a zero-crossing detector 20 is provided for detecting the zero-crossing phase of the motor main circuit 6 for phase control. An AND gate 21 is provided for arranging logical conditions under which the motor M is started when there is no error such as overload or phase loss. The soft starting period during which the start compensating operation is executed is determined based on data supplied to the means 18 from a soft starting period setting means 16 or from the key control station 3 through the second data selector 11.

The load current flowing in the motor main circuit 6 is detected by the current transformer 6a and a current detecting circuit 22 comprising a voltage-current converting circuit and an A/D converter and is converted to a digital value. The digital value is supplied to an overload detector 23 and a phase loss detector 24. Based on the digital value of the detected load current and the tripping conditions (rapid, normal, or slow, for example) supplied from the tripping condition setting means 17 or from the key control station 3 through the third data selector 12, the overload detector 23 performs the overload protecting operation by activating the NOR gate 25, and AND gates 26 and 21 to thereby turn the thyristors 7 off under the overload conditions. Also, the phase loss detector 24 detects the phase loss of the motor main circuit 6 based on the signals supplied from the current detecting circuit 22, thereby activating the NOR gate 25, and AND gates 26 and 21 to turn the thyristors 7 off when a phase loss is detected.

The signal delivering controller 13 of the local control station 4 is supplied, from the signal receiving controller 9, with the command signals directed to the other local control stations 4, with signals of data of operating conditions set at the local control station 4 (the tripping conditions and the soft starting conditions), with operations performed at the local control station 4 (opening and closing of the main circuit 6, process of the start compensating operation, process of the phase loss protecting operation, and the switching of the REMOTE/LOCAL mode selecting switch), and with data of the value of the load current detected by the current detector 22, thereby converting the electrical signals to the serial signals, which are supplied to the optical connector 27. The optical connector 27 operates to convert the electrical signals supplied from the signal delivering controller 13 to the optical signals, which are transmitted to the next local control station 4 through the optical fiber cable 5. Each component of the local control station 4 thus comprises a microcomputer except the REMOTE/LOCAL mode selecting switch 14, the zero-crossing detector 20, the on-off switch 15, the soft starting period setting means 16, the tripping condition setting means 17, the thyristors 7, the optical connectors 8 and 27, the A/D converter of the current detecting circuit 22, and the current transformer 6a.

Figure 3:
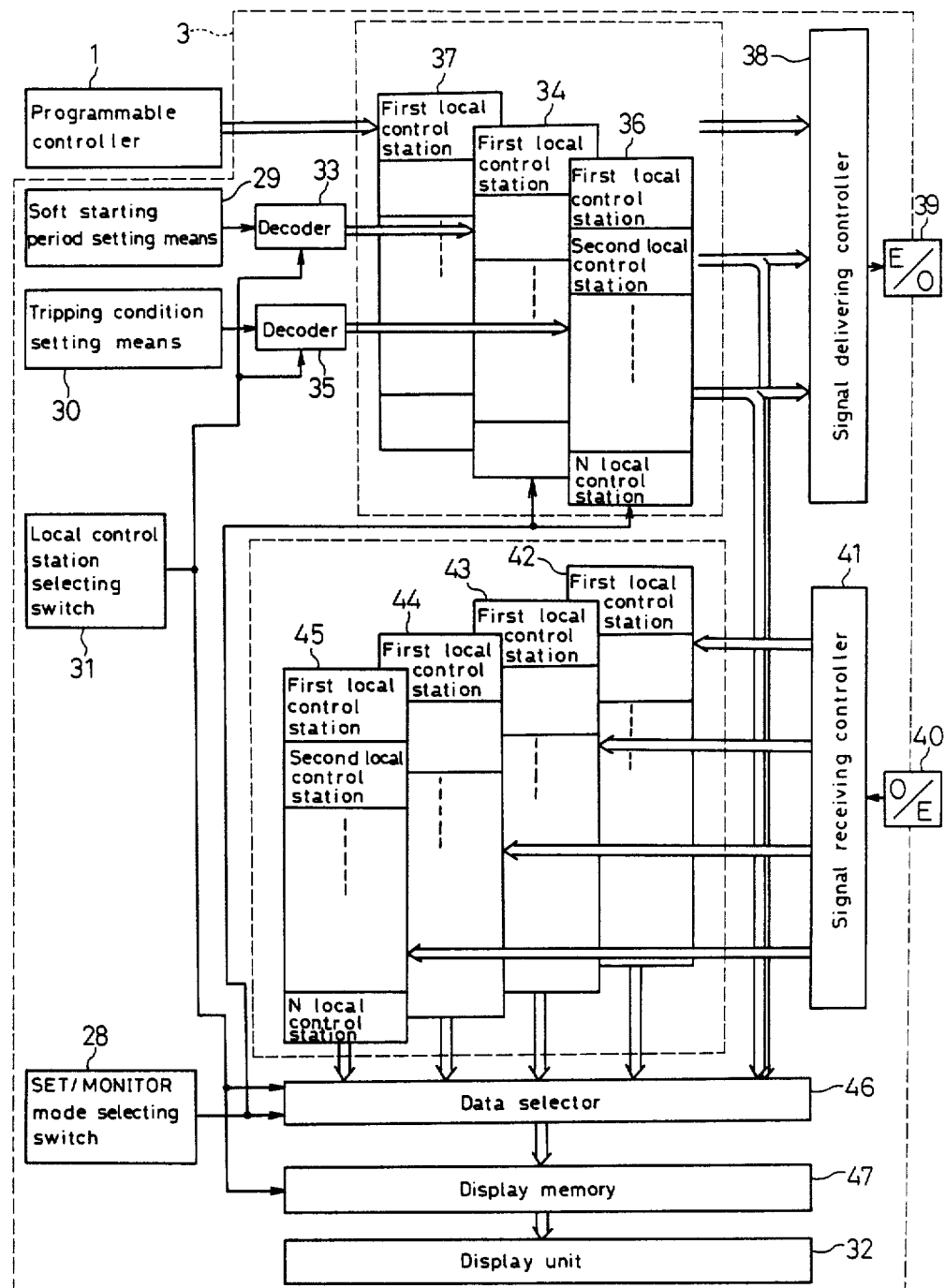
FIG. 3 is a block diagram illustrating the arrangement of the key control station.

The description will now be given to the key control station 3. Referring to FIG. 3, the key control station 3 comprises a SET/MONITOR mode selecting switch 28, a soft starting period setting means 29, a tripping condition setting means 30, a local control station selecting switch 31, and a display unit 32. A reference number given to each local control station 4 is inputted with the local control station selecting switch 31 when the SET/MONITOR mode selecting switch 28 is maintained at a SET position. Then, when a desired smooth start period is set by operating the soft starting period setting means 29, data associated with the soft starting periods for the individual local control stations 4 is stored at a set memory 34 through a decoder 33. Similarly, when data of desired tripping conditions is inputted with the tripping condition setting means 30 after input of a desired local control station reference number, the data of the desired tripping conditions for each local control station 4 is stored at the set memory 36 through the decoder 35. A set memory 37 is provided for storing data of on-off command signals for each local control station 4 supplied from the programmable controller 1. On-off command signals directed to each local control station 4, the tripping conditions and the smooth start periods are fetched from the respective set memories 34, 36 and 37 to a signal delivering controller 38 as a signal delivering end. The fetched data signals are put in order in accordance with the respective local control stations 4, thereby converting the signals to serial signals. The serial signals are then converted to to optical signals, which are transmitted to the local control station 4 through the optical fiber cable 5. Thus, the electric motor M and the like are controlled at the respective load control stations 4.

The optical fiber cable 5 connected to the last load at its one end is connected to an optical connector 40 of the key control station 3 at its other end. The optical connector 40 converts the optical signals supplied from each local control station 4 to electrical signals to thereby supply the electrical signals to the signal receiving controller 41 as a signal receiving end. The signal receiving controller 41 fetches the data for each local control station 4. The data is classified in accordance with four kinds of data elements to be thereby stored at monitor memories 42–45. More specifically, data of the tripping conditions set at the respective local control stations 4 are stored at the monitor memory 42. Data of the soft starting periods set at the respective local control stations 4 are stored at the monitor memory 43. Data of the load currents at the respective local control stations 4 are stored at the monitor memory 44. Data of several operation circumstances at the respective local control stations 4 are stored at the monitor memory 45, the data of the operation circumstances including the opening and closing of the motor main circuit 6, execution of the start compensating operation, execution of the overload protection operation, execution of the phase-loss protection operation, and the selection of the REMOTE or LOCAL mode. When the SET/MONITOR mode selecting switch 28 is maintained at the SET position, a data selector 46 reads out the data stored at the set memories 34, 36 and 37 and supplies a display memory 47 with the data of the local control station 4 selected with the local control station selecting switch 31. When the SET/MONITOR mode selecting switch 28 is maintained at the MONITOR position, the data selector 46 reads out the data stored at the monitor memories 42–45 and supplies the display memory 47 with the data of the local control station 4 selected with the local control station selecting switch 31. The display unit 32 then operates to display the data of the opening and closing of the main circuit 6, the start compensating operation, the overload protection operation, the phase-loss protection operation, the operating conditions of the start compensating and overload protection operations, and the value of the load current flowing in the main circuit 6 with respect to the selected local control station 4. The display unit 32 further operates to display the data of the soft starting period and the tripping conditions set for each local control station 4 at the key control station 3. The components of the key control station 3 comprises microcomputers, except the soft starting period setting means 29, the tripping condition setting means 30, the SET/MONITOR mode selecting switch 28, the local control station selecting switch 31, the optical connectors 39 and 40, and the display unit 32. Each of the memories 34, 36, 37, 42–45 and 47 is an external memory.

The operation of the control of the embodiment will now be described. The local control stations 4 are connected to the main circuits 6 of the respective loads such as the electric motor M. The key control station 3 and the local control stations 4 are connected by the optical fiber cables 5 so that a line of loop signal transmission path is provided. The line of signal transmission path is simplified as compared with the power cables radially extending from the control center in the prior art control systems. Moreover, since the optical fiber can transmit a large amount of information at one time, the optical fiber cable 5 has a smaller diameter than the conventional electrical cable or control cable.

When the programmable controller 1 is operated, onoff signals for load control are supplied to the key control station 3 from the programmable controller 1 in accordance with the preprogrammed sequence. The serial signals with respect to each local control station 4 are supplied from the signal delivering controller 38 of the key control station 3 to the optical connector 38, from which optical signals are transmitted to the local control station 4 through the optical fiber cable 5. When the optical signals are received by the optical connector 8 of the first control station 4 connected to the key control station 3 by the optical fiber cable 5, the optical signals are converted to electrical signals at the optical connector 8, thereby supplying the signal receiving controller 9 of the local control station 4 with electrical signals. The signal receiving controller 9 fetches the command signals directed to the local control station 4 and transfers the command signals directed to the other local control stations 4 to the signal delivering controller 13, which converts the electrical command signals directed to the other local control stations and the data signals of the operating conditions, the operations of the local control station 4 and the value of load current, to serial signals to thereby supply the optical connector 27 with the serial signals. The data signals are then transmitted from the optical connector 27 to the next local control station 4 through the optical fiber cable 5. The signal receiving controller 9 of the local control station 4 fetches the command signals directed to the local control station 4 and transfers, to the signal delivering controller 13, the command signals directed to the other local control station 4 and the data signals of the operating conditions and operation of the other local control stations 4. These transferred signals are transferred to the optical connector 27 together with the data of the operating conditions and operation of the local control station 4 to be thereby transmitted to the next local control station 4 through the optical fiber cable 5. The other local control stations 4 operate in the same manner as is described above with respect to the first and second local control stations 4. Accordingly, each local control station 4 fetches the command signals directed to the individual local control station 4, serving as a signal relay for the optical signals from the key control station 3 through a line of optical fiber cables 5. The data of the operating conditions and operation of each local control station 4 are thus supplied to the key control station 3 through the optical fiber cables 5. When the REMOTE/LOCAL mode selecting switch 14 is maintained at the REMOTE position at each local control station 4, the start compensating operation is executed to start running the motor M when the "on" signal is supplied to the motor M as a load in accordance with the sequence set at the programmable controller 1. In the start compensating operation, the phase controller 19 receives signals synchronized with a zero-crossing phase of the main circuit 6 from the zero-crossing detector 20 when the signal is supplied to the phase controller activating means 18. Based on the synchronized signals, the thyristors 7 are turned on and off through the AND gate 21 with the phase-control angle gradually increased. When the preset soft starting period elapses after output of "on" signal to the motor M, the thyristors 7 are alternately turned on at each half cycle and are rendered completely conductive. The current flowing into the main circuit 6 during the running of the motor M is detected by the current transformer 6a and the current detecting circuit 22 and the data of the load current value is transmitted to the key control station 3 through the signal delivering controller 13 and the optical connector 27. The data of the load current value is also supplied to the overload detector 23 and the phase loss detector 24 of the local control station 4. Consequently, when an overcurrent flows through the main circuit 6, the overcurrent protection operation is performed in accordance with the preset tripping conditions to thereby interrupt the main circuit 6. The overcurrent protection operation is executed by turning the thyristors 7 off when the output of the NOR gate 25, the AND gates 26 and 21 is turned to the "0" state. Further, when the phase loss occurs in the main circuit 6, the phase loss detector 24 detects the phase loss to thereby turn the thyristors 7 off by turning the output of the NOR gate 25 to the "0" state.

In the embodiment, the operating conditions for each of the start compensating operation and the overcurrent protection operation can be set at either the key control station 3 or at each local control station 4. For example, in the case of setting these operating conditions at the key control station 3, the operating conditions are set either with the soft starting period setting means 29 or the tripping conditions setting means 30 after a corresponding local control station 4 is selected with the local control station selecting switch 31. Data of the operating conditions set is stored at either set memory 34 or 36 and the data of the operating conditions are transmitted from the signal delivering controller 38 to the local control station 4 through the optical connector 39 and the optical fiber cables 5. The data is fetched into the local control station 4 and supplied to the phase controller activating means 18 or the overload detector 23 through the second data selector 11 or the third data selector 12 if the REMOTE/LOCAL mode selecting switch 14 is maintained at the REMOTE position. When these operating conditions are set at each local control station 4, the REMOTE/LOCAL mode selecting switch 14 is turned to the LOCAL position. The operating conditions are set with the soft starting period setting means 16 or the tripping condition setting means 17. Furthermore, to open or close the main circuit 6 directly at the local control station 4, the REMOTE/LOCAL mode selecting switch 14 is turned to the LOCAL position and then the on-off switch 15 of the local control station 4 is operated.

Data of the operating conditions, operation and the load current value at each local control station 4 are transmitted to the key control station 3 through the optical fiber cables 5. The data are stored at each of the monitor memories 42-45 of the key control station 3. Then, the SET/MONITOR mode selecting switch 28 is turned to the MONITOR position and the reference number of a desired local control station 4 is inputted with the local control station selecting switch 31. Then the data are stored at the display memory 47 and can be displayed by the display unit 32. Consequently, the local control stations 4 are monitored at the key control station 3 in a centralized manner.

Figure 4:
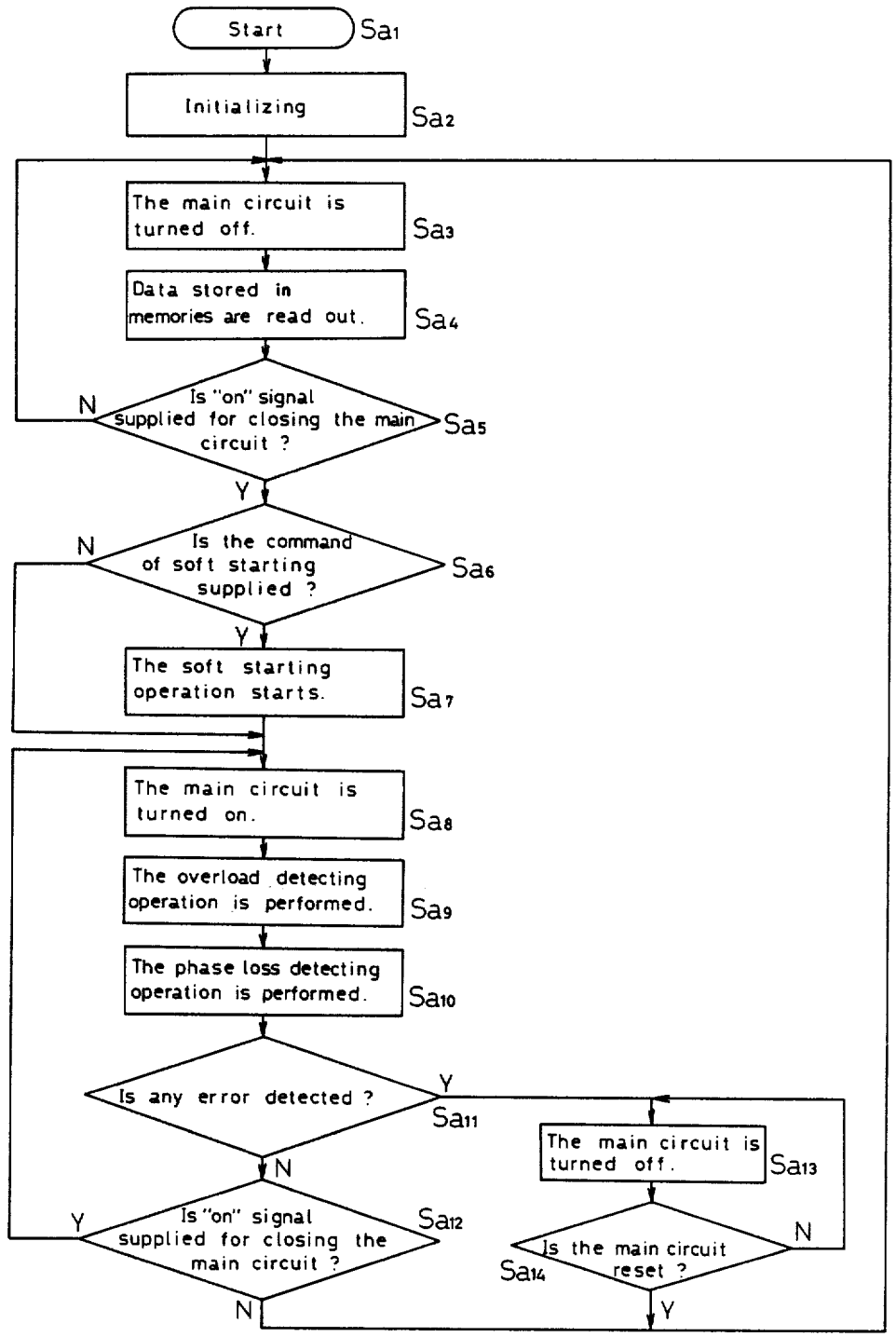
FIG. 4 is a flow-chart illustrating the processing steps of the microcomputer incorporated in the local control station.

FIG. 4 illustrates the processing of the microcomputer with respect to the above-described operation of each local control station 4. Following the start operation at step $Sa_1$, each RAM, register, flag and input and output member is reset at step $Sa_2$ to cope with the next operation. The main circuit 6 is opened at step $Sa_3$ and the data of the soft starting period, tripping conditions for the overload protection, and the value of the rated current stored in the memories are read out at step $Sa_4$.

At step $Sa_5$, whether the "on" signal is supplied for closing the main circuit 6 or not is determined. When the determination is made that the "on" signal is supplied, whether the command of the soft start is supplied or not is determined at step $Sa_6$. When the determination has been made that the soft starting command has been supplied, the soft starting operation is commenced at step $Sa_7$. The process of closing the main circuit 6 is performed at step $Sa_8$ and the overload protecting operation is performed at step $Sa_9$. The phase-loss detecting operation is performed at step $Sa_{10}$. At step $Sa_{11}$, whether there is any error in the loads or not is determined. When the determination is made that there is no error, whether "on" signal for the main circuit 6 is supplied or not is determined at step $Sa_{12}$. When the determination is made that the "on" signal for the main circuit 6 has been supplied, the operation is returned to step $Sa_8$. When the determination is made at step $Sa_{11}$ that there is an error, the main circuit 6 is opened at step $Sa_{13}$. Whether the reset of the main circuit 6 is established or not is determined at step $Sa_{14}$. When the determination is made that the reset of the motor M has been established, the operation is returned to step $Sa_3$ where the main circuit 6 is opened.

Figure 5:
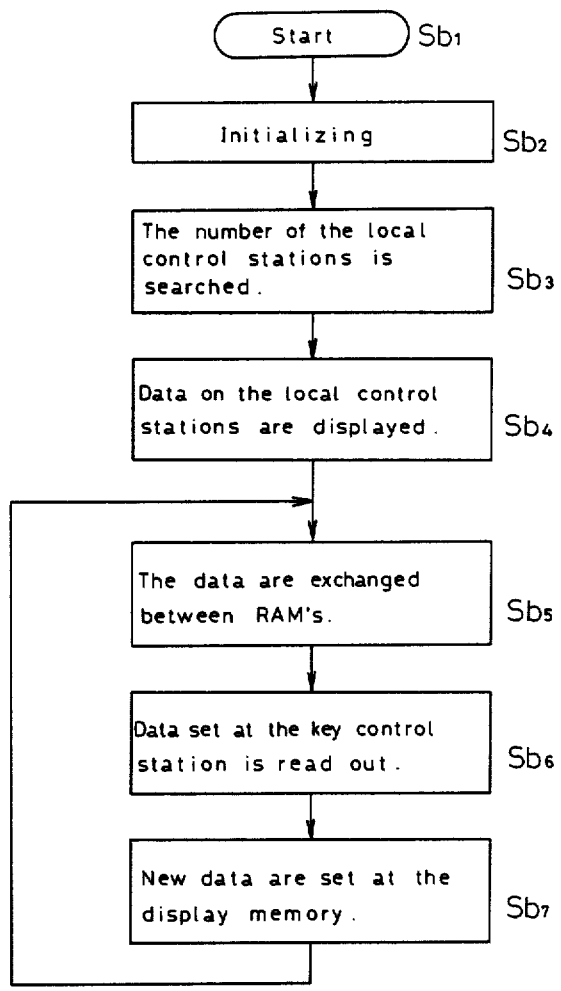
FIG. 5 is a flow-chart illustrating the processing steps of the microcomputer incorporated in the key control station.

FIG. 5 illustrates the processing of the microcomputer at the key control station 3. The microcomputer is turned on at step $Sb_1$ and is initialized at step $Sb_2$. At this step, the RAM's, registers, flags and input and output devices of the key control station 3 are reset for the next operation. The number of the local control stations 4 is searched at step $Sb_3$. In the control system of the embodiment, a time sharing system is employed for data transmission between the key control station 3 and each local control station 4 and between the local control stations 4 through the optical fiber cables 5, so that the scanning between the key control station 3 and each local control station 4 requires the search of the number of the local control stations 4. At step $Sb_4$, the data of each local control station 4 are displayed. At step $Sb_5$, the transmission data stored at the RAM in the signal delivering controller 38 of the key control station 3 are rewritten in turn and the data stored at the signal receiving controller 41 are also rewritten in turn. The data set with the soft starting period setting means 29, the tripping conditions setting means 30, the local control station selecting switch 31, and the SET/MONITOR mode selecting switch 28 are read out at step $Sb_6$. The new data is set at the display memory 47 at step $Sb_7$ and then the operation is returned to step $Sb_5$ to be reiterated.

According to the control system of the embodiment, the key control station 3 and a plurality of local control stations 4 are connected with the optical fiber cables 5 so that the data is transmitted through a line of loop signal transmission path. Accordingly, only one line of optical fiber cables is required as compared with the conventional multiple lines of power cables radially extending from the control system. Moreover, the optical fiber cable is capable of transmitting a large amount of information and the diameter of the cable is small, which also simplifies the cable wiring. Further, since the thyristers 7 are employed for making and breaking the main circuit 6, frequent maintenance of the switch contacts is not required unlike the conventional control system employing electromagnetic contactors. Accordingly, the burden of maintenance is reduced to a large extent and the semi-conductive switching element is well suited to the frequent operations for making and breaking the main circuit. The employment of the thyristers 7 also makes it possible for the programmable controller 1 to control a plurality of loads in a precise manner. Moreover, the start compensating operation, overload protection operation and phase loss protection operation can be performed reasonably. More specifically, since the exciting electric power required for the electromagnetic contactor employed in the conventional control system takes is relatively large, it is difficult to control the exciting electric power by means of an electronic appliance such as the programmable controller or the microcomputer. In order to attain this object, the electrical power would have to be amplified in a cascaded manner. Consequently, the control system would be large and complicated. In the present invention, however, a microcomputer is provided at each local control station 4 so as to control the thyristors 7 as described above, so that both precise control over the thyristors 7 and compactness of the control system can be attained at the same time.

In the conventional control system wherein a magnetic contactor having two contacts is employed for making and breaking the main circuit, the start compensating operation by way of phase control cannot be performed due to limitations in the switching frequency. In the conventional control system, in order to perform the start compensating operation in another manner, a start compensator and another magnetic contactor for activating a reactor or a stardelta starter would need to be provided in addition to the magnetic contactor for making and closing the main circuit. In the present invention, however, the phase-control is performed by way of the semi-conductive switching element and the arrangement for the start compensation is simplified. Additionally, the overload and phase-loss protection operations is also performed by way of the semi-conductive element in a simplified manner. Particularly, in this embodiment, the key control station 3 is provided with a display unit 32 for displaying data associated with the making and breaking of the main circuit, the start compensating operation, the overload protection operation, the phaseloss protection operation and with the value of the load current flowing into the main circuit. Accordingly, the monitoring of a plurality of loads in the centralized manner can be performed.

In the embodiment, particularly, the REMOTE/LOCAL mode selecting switch 14 provided at each local control station 4 selectively effectuates each of the setting means 29 and 30 provided at the key control station 3 and each of the setting means 16 and 17 provided at each local control station 4. As a result, one or more of the local control stations 4 may be operated under the LOCAL mode and the other local control stations may be simultaneously operated under the REMOTE mode. The following advantage can be attained by the above-described function: When an error occurs in one of the loads of the local control stations 4 operated in accordance with the REMOTE mode, the local control station 4 corresponding to the load in error may be operated in accordance with the LOCAL mode so that the local control station 4 corresponding to the load in error is deviated from the sequential control operation of the programmable controller 1 of the key control station 3. Consequently, the load in error may manually be operated or stopped to see the error in the load while the other loads are operated in accordance with the sequential operation of the programmable controller 1.

The foregoing disclosure and drawings are merely illustrative of the principles of this invention and are not to be interpreted in a limiting sense. The only limitation is to be determined from the scope of the appended claims.

What is claimed is:

1. A centralized control system for controlling a group of electric motors, comprising:
   a single key control station;
   a number of local control stations connected in series to the key control station through optical fiber cables so that a line of closed loop signal transmission path is formed between a signal delivering a signal receiving end of the key control station, said local control stations corresponding to a number of motors;
   semi-conductive switching elements having gates provided so as to close and open electrical power supply circuits of the motors;
   and a programmable controller for supplying each local control station with an on-off operation command for turning each semi-conductive switching element on and off to control each motor so that each motor is driven and stopped in accordance with a predetermined program, each of the local control stations comprising:
   (a) a current transformer for measuring a load current flowing through a power supply circuit of the motor;
   (b) an overload detector for detecting an output current of the current transformer to determine whether or not the motor is in the overload condition, thereby producing a detection signal, said overload detector executing a motor protection operation, of tripping the motor by turning off the semi-conductive switching element, in accordance with the detection signal;
   (c) a first optical connector for converting optical signals to corresponding electrical signals, said first optical connector being connected to the optical fiber cable through which data is transmitted from other local control stations;
   (d) a second optical connector for converting electrical signals to corresponding optical signals, said second optical connector being connected to the optical fiber cable through which data is transmitted to other local control stations;
   (e) a signal receiving controller for sequentially receiving electrical signals corresponding to data supplied from the first optical connector;
   (f) gate control means for controlling the gate of the semi-conductive switching element in accordance with data supplied from said signal receiving controller; and
   (g) a signal delivering controller for sequentially delivering to the second optical connector detection data produced by the overload detector and output data produced by the current transformer so that both data are transmitted to the key control station, said signal receiving controller transmitting to the signal delivering controller data supplied from the first optical connector to be directed to other local control stations so that data supplied from the first optical connector to be directed to the other local control stations is transmitted through the second optical connector to the optical fiber cable;
   the key control station comprising:
   (a) soft starting period setting means for producing data associated with the soft starting of each motor in accordance with which each semi-conductive switching element is controlled so that the input voltage of each motor is gradually increased at the time of the starting of each motor;
   (b) tripping condition setting means for producing data associated with the tripping of each motor to determine the time at which the overload detector starts the motor protection operation;
   (c) a reference number selecting switch for providing reference numbers so that inherent reference numbers are given to the respective local control stations in order to direct data thereto;
   (d) a first memory for storing the on-off commands produced by said programmable controller for each local control station;
   (e) a second memory for storing data supplied from said soft starting period setting means by manually operating the same, the data being stored in the second memory for each local control station in a manner so that the data is discriminated by reference numbers of the local control stations;
   (f) a third memory for storing data supplied from said tripping condition setting means by manually operating the same, the data being stored in the third memory for each local control station in a manner so that the data is discriminated by reference numbers of the local control stations;
   (g) a signal delivering controller for converting data of on-off commands stored in the first memory and data stored in the second and third memories to serial electrical signals so that the data is transmitted to the respective local control stations;
   (h) a first optical connector, connected to the optical fiber cable connected to the first local control station, the optical fiber connector converting the serial electrical signals supplied from the signal delivering controller to corresponding optical signals, thereby supplying the optical signals to the optical fiber cable;
   (i) a second optical connector, connected to the optical fiber cable extending from the last local control station, the second optical connector for converting the optical signals to corresponding electrical signals;
   (j) a fourth memory for storing data concerning the load current and data concerning overload detection, both supplied from each local control station through said second optical connector for each local control station; and
   (k) a display means for displaying the data stored in the fourth memory.

2. A centralized control system for controlling a group of electric motors, comprising:
   a single key control station;
   a number of local control stations connected in series to the key control station through optical fiber cables so that a line of closed loop signal transmission path is formed between a signal delivering and a signal receiving end of the key control station, said local control stations corresponding to a number of motors;
   semi-conductive switching elements having gates provided so as to close and open electrical power supply circuits of the motors; and
   a programmable controller for supplying each local control station with an on-off operation command for turning each semi-conductive switching element on and off to control each motor so that each motor is driven and stopped in accordance with a predetermined program, each of the local control stations comprising:

(a) a current transformer for measuring a load current flowing through the power supply circuit of the motor;

(b) an overload and phase-loss detector for detecting an output current of the current transformer to determine whether or not the motor is in the overload or phase-loss condition, thereby producing a detection signal, said overload and phase-loss detector executing a motor protection operation, of tripping the motor by turning off the semi-conductive switching element, in accordance with the detection signal;

(c) a first optical connector for converting optical signals to corresponding electrical signals, said first optical connector being connected to the optical fiber cable through which data is transmitted from other local control stations;

(d) a second optical connector for converting electrical signals to corresponding optical signals, said second optical connector being connected to the optical fiber cable through which data is transmitted to other local control stations;

(e) a signal receiving controller for sequentially receiving electrical signals corresponding to data supplied from the first optical connector;

(f) an on-off switch supplying an on-off operation command to turn the semi-conductive switching element on and off, thereby controlling the motor so that the motor is driven and stopped;

(g) soft starting period setting means for producing data associated with the soft starting of the motor in accordance with which each semi-conductive switching element is controlled so that the input voltage of the motor is gradually increased at the time of the starting of the motor;

(h) tripping condition setting means for producing data associated with the tripping of the motor to determine the time at which the overload and phase-loss detector starts the motor protection operation;

(i) a first data selector alternatively selecting a command from the on-off switch or from the signal receiving controller;

(j) a second data selector alternatively selecting data from the soft starting period setting means or from the signal receiving controller;

(k) a third data selector alternatively selecting data from the tripping condition setting means or from the signal receiving controller;

(l) a REMOTE/LOCAL mode selecting switch for supplying each of said first, second and third data selectors with a selection signal for the selection;

(m) controller means for controlling the gate of the semi-conductive switching element in accordance with data supplied from the first to third data selectors;

(n) a signal delivering controller for converting detection data from the overload and phase-loss detector, output data from the current transformer, and data supplied from each of the first to third data selectors into serial electrical signals so that the data is transmitted to the second optical connector to thereby supply the key control station with the serial signals, said signal receiving controller transmitting data directed to its own local control station to each of the data selectors and transmitting data directed to other local control stations to the signal delivering controller so that data directed to other local control stations is supplied to the optical fiber cable through the second optical connector;

said key control station comprising:

(a) soft starting period setting means for producing data associated with the soft starting of each motor in accordance with which each semi-conductive switching element is controlled so that the input voltage of each motor is gradually increased at the time of the starting of each motor;

(b) tripping condition setting means for producing data associated with the tripping of the motor to determine the time at which the overload and phase-loss detector starts the motor protection operation;

(c) a reference number selecting switch for providing reference numbers of the local control stations so that inherent reference numbers are given to the respective local control stations in order to direct data thereto;

(d) a first memory for storing the on-off commands produced by said programmable controller for each local control station;

(e) a second memory for storing data supplied from said soft starting period setting means by manually operating the same, the data being stored in the second memory in the order of the local control stations in a manner so that said data is discriminated by the reference numbers of the local control stations;

(f) a third memory for storing data supplied from said tripping condition setting means by manually operating the same, the data being stored in the third memory for each local control station in a manner so that the data is discriminated by reference numbers of the local control stations;

(g) a signal delivering controller for converting data of on-off commands stored in the first memory and data stored in the second and third memories to serial electrical signals so that the data is transmitted to each local control station;

(h) a first optical connector, connected to the optical fiber cable extending from the first local control station, the optical connector converting the serial electrical signals supplied from said signal delivering controller to optical signals, thereby transmitting the optical signals to the optical fiber cable;

(i) a second optical connector, connected to the optical fiber cable extending from the last local control station, the second optical connector for converting the optical signals to corresponding electrical signals;

(j) fourth to seventh memories for storing data concerning soft starting, tripping, load current, overload, and phase-loss supplied from each local control station for each local control station, respectively; and (k) a display means for displaying the data stored in the fourth to seventh memories.

* * * * *